United States Patent [19]

Yang

[11] 4,027,273
[45] May 31, 1977

[54] COMPACT PULSED LASER HAVING IMPROVED HEAT CONDUCTANCE

[75] Inventor: Lien C. Yang, Los Angeles, Calif.

[73] Assignee: The United States of America as represented by the Administrator of the National Aeronautics and Space Administration, Washington, D.C.

[22] Filed: Dec. 21, 1972

[21] Appl. No.: 317,310

[52] U.S. Cl. .......................... 331/94.5 P; 330/4.3; 331/94.5 D
[51] Int. Cl.² ................ H01S 3/045; H01S 3/092
[58] Field of Search ................ 331/94.5; 330/4.3

[56] References Cited

UNITED STATES PATENTS

| 3,440,558 | 4/1969 | Cameron | 331/94.5 |
| 3,451,010 | 6/1969 | Maiman | 331/94.5 |
| 3,676,798 | 7/1972 | McMahon | 331/94.5 |

OTHER PUBLICATIONS

NASA Tech. Brief No. 65-10289, "Boron Nitride Housing Cools Transistors", Sept., 1965, 2pp.
Haswell, III et al., Proceedings of the IEEE, Jan., 1964, p. 93.
Young, Microwaves – Laser Technology Section, July, 1968, pp. 69–78.

Primary Examiner—Robert J. Webster
Attorney, Agent, or Firm—Monte F. Mott; Paul F. McCaul; John R. Manning

[57] ABSTRACT

A highly efficient, compact pulsed laser having high energy to weight and volume ratios is provided. The laser utilizes a cavity reflector that operates as a heat sink and is essentially characterized by having a high heat conductivity, by being a good electrical insulator and by being substantially immune to the deleterious effects of ultra-violet radiation. Manual portability is accomplished by eliminating entirely any need for a conventional circulating fluid cooling system.

2 Claims, 7 Drawing Figures

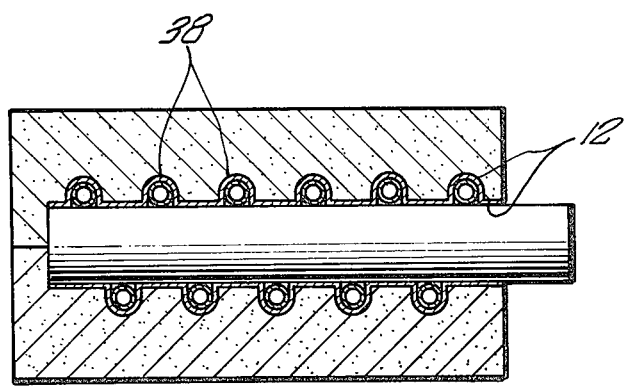
FIG_3_
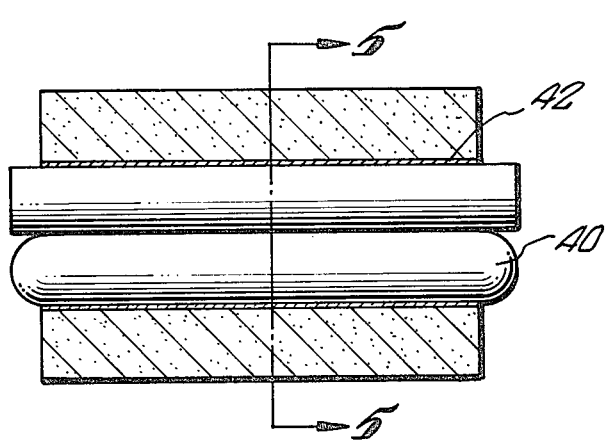
FIG_4_
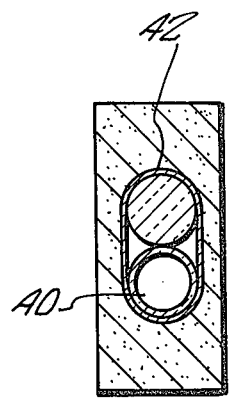
FIG_5_
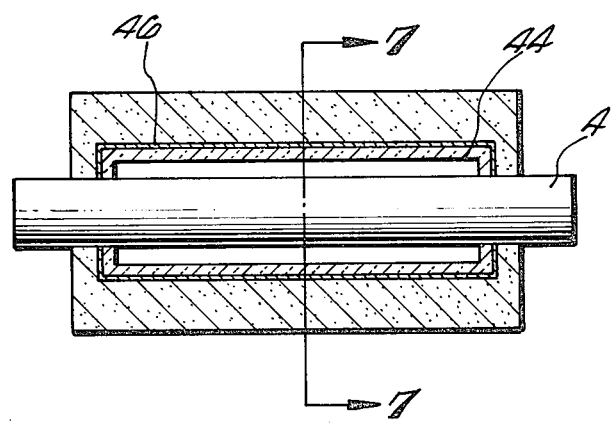
FIG_6_
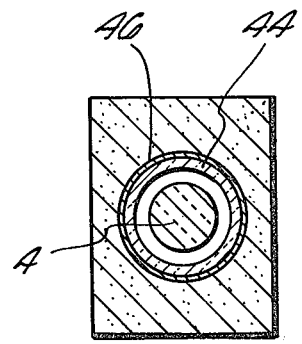
FIG_7_

COMPACT PULSED LASER HAVING IMPROVED HEAT CONDUCTANCE

BACKGROUND OF THE INVENTION

Origin of the Invention

The invention described herein was made in the performance of work under a NASA contract and is subject to the provisions of Section 305 of the National Aeronautics and Space Act of 1958, Public Law 85–568 (72 Stat. 435; 42 U.S.C. 2457).

Field of the Invention

The present invention relates to lasers and more particularly, to a compact pulsed laser assembly.

Description of the Prior Art

The ability to use a pulsed solid state laser in various different applications depends largely on its efficiency; that is, laser energy per unit volume or weight. The utility of compact solid state pulsed lasers for use in ranging, communication, and other applications depends to a large degree upon the energy to volume or weght relationship. As an example, a laser surveying device would best be manually portable.

In the early days of laser development, a considerable amount of effort was directed towards achieving the highest possible energy output. Today, however, the laser energies that are capable of being achieved have reached the self-destructive limits of the lasing materials. As a result, the emphasis has been on refining the environmental conditions for the operation of the laser material, i.e., cooling and pumping light coupling efficiency. The laser cavity itself has received significant amounts of attention since a laser must be highly efficient if a reasonable amount of output power is to be obtained. In this regard, the U.S. Pat. No. 3,683,296 provides an example of a laser cavity structure formed with a plurality of heat sink members carrying light emitting diode arrays which heat sink is itself cooled by being maintained in contact with a suitable coolant system. Additional cooling for a tubular laser rod may be provided by a heat sink mounted within the bore of the tubular laser rod.

A further example of laser cavity devlopment is exemplified by U.S. Pat. No. 3,413,567 which is directed to the features of reflection and cooling in a laser assembly. In the patented device, the laser cavity is formed of a metallic material such as aluminum, copper or silver. Liquid nitrogen can be utilized as the coolant fluid to facilitate the desired cooling of the laser rod.

Other examples of the prior art are found in U.S. Pat. No. 3,339,150; U.S. Pat. No. 3,423, 692; and U.S. Pat. No. 3,102,920 which disclose other liquid cooled lasers.

Prior art developments have not solved the outstanding problem of providing a small, lightweight, manually-portable, and inexpensive laser unit that can produce laser pulses of up to approximately twenty joules of laser output energy. Obviously such a pulsed laser would be ideal for use in many areas of technology such as aerospace, medicine, communication, welding, etc. Generally, lasers in the prior art that are capable of producing such a level of output energy are large, heavy and bulky as a result of the necessary technique and structure utilized to dissipate the heating produced during the lasing operation. For example, it has generally been necessary to circulate large quantities of filtered air, or other fluid to cool the hot laser elements. Such cooling usually requires that the laser elements be spaced apart and constructed with sufficiently large dimensions so that it is possible to force large quantities of cooling fluid into intimate contact with all of the hot surface areas of the laser elements. As can be understood, a cooling system of such a nature is contrary to the functional requirement that, for maximum efficiency, the laser elements be constructed as compact as possible.

An additional problem with prior art devices from the standpoint of compactness and efficiency has been the provision of sufficient insulation for the high pumping voltage required to operate the flash lamp used to cause lasing. Such insulation generally increases the bulkiness and weight of the laser assembly. The generation of ultra-violet radiation and its effects on most dielectric materials further complicates the ability to provide a compact laser assembly that will not be quickly destroyed or otherwise caused to deteriorate by operation of the laser. Finally, it is highly desirable to utilize insulating material which is easily machineable and safe from an operator viewpoint.

OBJECTS AND SUMMARY OF THE INVENTION

Accordingly, it is a primary object of the present invention to provide a highly efficient and compact pulsed laser device that is capable of producing laser pulses of up to approximately twenty joules of laser energy wherein the laser assembly has an energy to weight ratio and an energy to volume ratio that permits the laser assembly to be manually portable.

It is another object of the present invention to provide a laser device including a heat sink which has sufficiently high heat conductivity to permit the complete omission of a circulating fluid cooling system.

It is a further object of the present invention to provide a laser device including a heat sink that serves as a reflecting cavity and which is readily formed to accommodate various forms of flash lamps.

It is yet a further object of the present invention to provide a heat sink for a solid state pulsed laser device that is a good heat conductor and electrical insulator, light in weight, immune to deleterious effects of ultra-violet radiation, and easily machineable.

Briefly described, the present invention involves a highly efficient, compact pulsed laser device that is manually portable.

More particularly, the subject pulsed later device essentially includes a solid laser rod that is concentrically surrounded by a flash lamp for causing laser excitation. A reflective cavity is maintained in surrounding proximity to the laser rod and flash lamp to provide a reflective surface for light energy produced by the flash lamp and to accomplish efficient heat dissipation to permit the total omission of any other cooling apparatus for the laser device.

Further objects and the many attendent advantages of the present invention will be more readily appreciated as the same becomes better understood by reference to the following detailed description which is to be considered in connection with the accompanying drawings wherein like reference symbols designate like parts throughout the figures thereof.

BRIEF DESCRIPTION OF THE DRAWINGS

FIG. 3 is a schematic diagram illustrating a cross sectional view of another embodiment of the present invention utilizing a helical flash lamp.

FIG. 4 is a schematic diagram illustrating a cross sectional view of yet another embodiment of the present invention utilizing a parallel oblong lamp.

FIG. 5 is a schematic diagram illustrating a sectional view taken along the lines 5 — 5 of FIG. 4.

FIG. 6 is a schematic diagram illustrating a cross sectional view of another embodiment of the present invention utilizing a lamp encompassing the laser rod.

FIG. 7 is a schematic diagram illustrating a transverse cross sectional view of the embodiment of FIG. 6 taken along lines 7 — 7.

DESCRIPTION OF THE PREFERRED EMBODIMENT

The laser assembly design problems imposed under the restrictions of weight and size essentially involve the total efficiency of each link in the chain of components used for laser generation. Typically, a complete laser assembly includes a power supply, high voltage circuitry, a capacitor bank, a flash lamp, a pumping configuration, a laser rod, and a cooling system. Weight and volume restrictions have a fundamental impact on the efficiency of a design because certain ones of the components are difficult to miniaturize. The fluid cooling system used in prior art devices represents a primary and long standing impediment to size reduction. By using a laser assembly including a heat sink formed with a material of both high heat conductance and good electrical insulation characteristics, such as boron nitride, it is possible in accordance with the present invention to efficiently conduct heat away from the rod and flash lamp without the need for any fluid cooling system whatsoever. The heat sink may also be shaped and positioned to maximize the use of light energy from the flash lamp to thus optimize the construction of a very compact laser.

Figure 1:
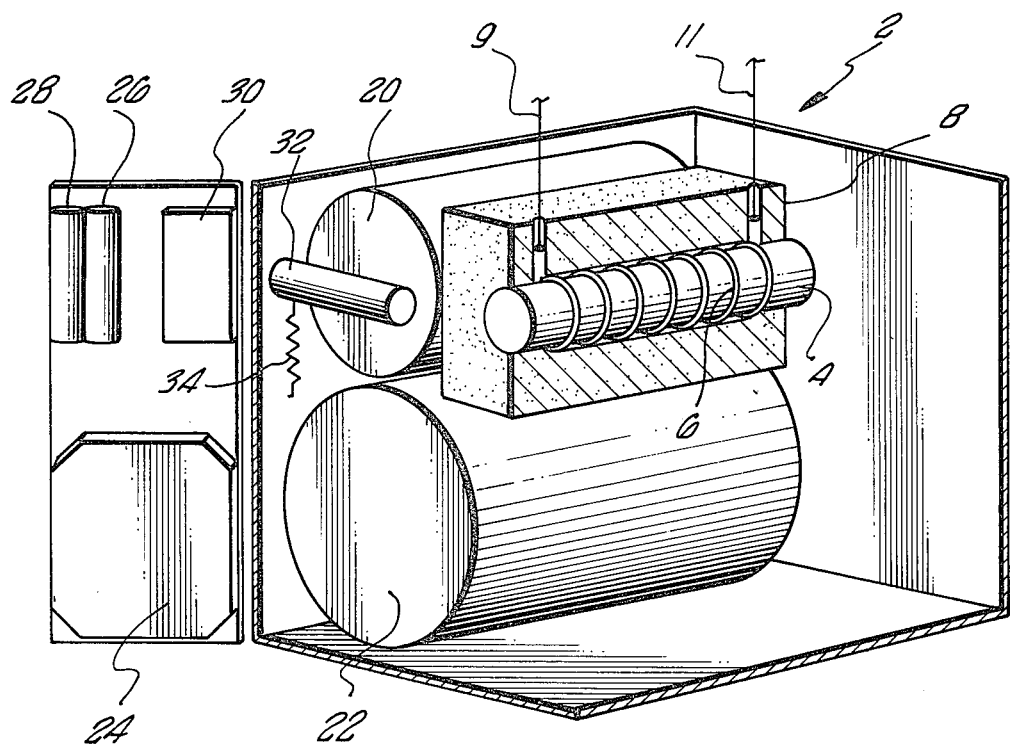
FIG. 1 is a schematic diagram illustrating a perspective view of an embodiment of the present invention.

Referring to FIG. 1, a laser device or assembly 2 in accordance with the invention utilizes a neodymium laser rod 4 that can be made from fused silica doped with 3 percent by weight of $Nd_2O_3$. Typically, a neodymium glass rod can be 1.27 cm in diameter and 15.24 cm long and have a flat end configuration. A rough lateral surface of 0.3 micron roughness combined with an absorption coefficient $A = 0.18$ cm$^{-1}$, which corresponds to the doping level for the effective pumping band of 5700 to 6000 A, will provide a very uniform pumping of the laser rod 4. As a result, the optical gain and energy output are quite homogeneous over the cross section of the laser rod 4. The laser rod 4 can also be doped with cerium oxide for antisolarization purposes such that use of an ultra-violet shield between the flash lamp and the rod is unnecessary. The pair of laser mirrors 5 and 7 suitable for use can have, for example, a reflectivity of 50 to 85 percent and 100 percent, respectively, at 1.06 microns. Such mirrors 5 and 7 may generally be formed with multi-layer ZnS and $ThOF_2$ films that are vacuum deposited on the ends of the laser rod 4 and have a 1/20 wavelength flatness at 1.06 microns. The mirrors 5 and 7 are preferably parallel to each other within 0.5 seconds of arc.

A helical flash lamp 6 can be made from a quartz tube having 5 mm inside diameter and a 7 mm outside diameter. The length of the lamp 6 can be 12.7 cm with an inside helical diameter of 1.3 cm to closely fit a laser rod 4 having the above described dimensions. By using 12 helical turns spaced 3 mm apart, it is possible to obtain a homogeneous light irradiance on the surface of the rod 4. Generally, the lamp anode and cathode electrodes can be made of tungsten and stainless steel respectively and a xenon gas can be utilized at 300 mm kg pressure.

The design of the laser cavity itself utilizes a ratio of volume occupied by the laser rod 4 to that of the cavity itself that is as large as possible. In operation the light generated by the flash lamp 6 undergoes multi-reflections and refractions by the lamp walls, the laser rod 6, and the cavity reflector. This causes the light energy density inside the cavity to be quite homogeneous. Therefore, the large relative volume of the laser rod 4 will allow more light to be absorbed for laser action.

In order to avoid the use of large chokes of the order of $10^2$ microhenries, it is possible to use an RC discharge to excite the flash lamp 6. An effective arc length of 79 cm and a quartz tubing with an inside diameter of 5 mm taken in conjunction with a 54 microfarads capacitor bank can be utilized to provide an arc resistance of 9.0 ohms at 4.9 kv. The resulting average current density of 1000 amp./cm$^2$ corresponds to approximately 7000° K in color temperature producing a black body radiation highly rich in the effective pumping band (5700 to 6000 angstroms) of the neodymium ions.

The necessary high pumping voltage can be provided through a pair of leads 9 and 11 that extend through a diffusive heat sink 8 which also serves as support for the laser rod 4 and flash lamp 6. It is necessary for the heat sink to both effectively remove the generated heat and to have a high dielectric strength for accommodating the high voltages transmitted to the flash lamp 6. Further, it is necessary for the heat sink 8 to be resistant to the high ultra-violet content of the flash lamp light. Most dielectric material such as epoxy, fiberglass, and teflon experience a surface burning effect when exposed to high doses of ultra-violet light and the use of these materials has been found to produce residues which are deposited on the surfaces of the laser rod 4 and the flash lamp 6 leading to deterioration of the output of the laser rod 4 after a limited number of operations of the laser assembly 2.

With the emphasis upon the compactness and portability of the laser assembly 2, it is highly desirable to provide a heat sink that does not require an auxiliary cooling system. It has been found that boron nitride is particularly suitable for use in forming a heat sink 8 in accordance with the present invention. Boron nitride presents the advantage of having a very high thermoconductivity, i.e., in the range of 0.28 watts cm/cm$^2$ °K, and a dielectric strength of $3.8 \times 10^4$ volts/mm. In addition, boron nitride has a reflectivity of 82 percent across the visible spectrum and an excellent resistance to ultra-violet radiation. An additional advantage is its excellent machineability as compared to other materials such as alumina or beryllia that have been used as heat sinks. Alumina in particular shows color changes as a result of irradiation by an xenon flash lamp. Beryllia presents a health hazard. Boron nitride has been further found to have excellent resistance to oxidation at temperatures up to 1300° F and is generally less brittle than most ceramic materials.

In addition, boron nitride can be formed to have a preferential direction of thermal conductivity depending upon the application of molding pressure. Thus, it is possible to have a high thermoconductivity directed radially away from the laser rod 4 towards the surface of the boron nitride heat sink 8 and a lower conductivity in directions parallel to the laser rod 4. The following Table I, exemplifies how the thermal conductivity of boron nitride can vary depending upon the direction of the applied molded pressure

TABLE I

| THERMAL CONDUCTIVITY BTU/hr. sq.ft. and ° F/in. of thickness | | |
|---|---|---|
| Temp. ° F. | Direction A* | Direction B** |
| 70 | 137 | 274 |
| 600 | 127 | 254 |
| 819 | 123 | 246 |
| 1035 | 119 | 238 |
| 1311 | 112 | 224 |
| 1793 | 108 | 216 |

*Direction A - Measured parallel to molding pressure.
**Direction B - Measured perpendicular to molding pressure.

Similarly, the resistivity of boron nitride can be made to vary as a function of temperature by the selective application of pressure. Table II hereinbelow includes representative data for such a characteristic of boron nitride.

TABLE II

| RESISTIVITY VS. TEMPERATURE | | |
|---|---|---|
| | | Resistivity, ohm-inches |
| Temp. ° F | Direction A | Direction B |
| 77 | $7.5 \times 10^{12}$ | $3.9 \times 10^{12}$ |
| 788 | $1.7 \times 10^{11}$ | $1.9 \times 10^{10}$ |
| 1022 | $8.3 \times 10^{8}$ | $1.9 \times 10^{8}$ |
| 1220 | $3.4 \times 10^{7}$ | $1.6 \times 10^{7}$ |
| 1418 | $3.9 \times 10^{6}$ | $1.9 \times 10^{6}$ |
| 1580 | $8.3 \times 10^{5}$ | $5.5 \times 10^{5}$ |
| 1688 | $3.11 \times 10^{5}$ | $3.2 \times 10^{5}$ |

Referring again to FIG. 1, a high voltage, energy bank for a laser assembly may include a pair of 5,000 volt high energy density capacitors 20 and 22 having respectively 44 microfarad and 10 microfarad ratings. In terms of size, the capacitor 22 typically may be 16.5 cm long and 10.2 cm in diameter with a weight of 2.27 kg while the capacitor 20 may be 16.5 cm long and 5.1 cm in diameter and weigh 0.68 kg.

In practice a dc to dc high voltage converter 24 found to be usable with the present invention included a regulated 2.7 kc oscillator, an 11.8 db amplifier, a voltage step-up transformer (X54), and rectifiers. The converter 24 would weigh approximately 1.6 kg with a volume displacement of roughly 430 cm$^3$. The input requires 24 to 28 VDC and 9 amperes peak current while the output may be adjustable from 3 to 6 KV at 25 milliamps average current level via a 10,000 ohm potentiometer.

The particular circuit configuration of the converter 24 may be conventional and is therefore not disclosed in detail. The specific parameters are disclosed to provide a general indication of volume and weight which are readily appreciated by persons having ordinary skill in the art, once given such parameters.

Discharge of the flash lamp 6 can be conveniently initiated by a twenty kilovolt, 6.0 microsecond triggering pulse. Such a pulse can be generated by discharging the energy stored in an 8 microfarad capacitor 26 through the primary of a triggering transformer 28 having a term ratio of 112:1. The triggering capacitor 26 can be charged with a small dc to dc converter triggering power supply 30. Electrical connections have been omitted from FIG. 1 for the sake of simplicity. Again, the capacitor 26, the transformer 28, and the power supply 30 are illustrated for the purpose of demonstrating exemplary volume and weight requirements for a pulsed laser in accordance with the invention.

A high current rated dc input can be provided for the laser device by a battery pack providing 28 vdc at a 9 amp discharge rate. A push-button dump switch 32 can be utilized to permit the high voltage energy to be bypassed and discharged through a 10 watt 50 kilohm power resistor 34.

The compact design disclosed by FIG. 1 is only possible due to the use of the efficient heat sink 8. It has been found that a pulsed laser constructed in accordance with the present invention can be made to have an energy to weight ratio of 3.11 joules per kilograms and an energy to volume ratio of 0.00397 joules per cm$^3$.

Figure 2:
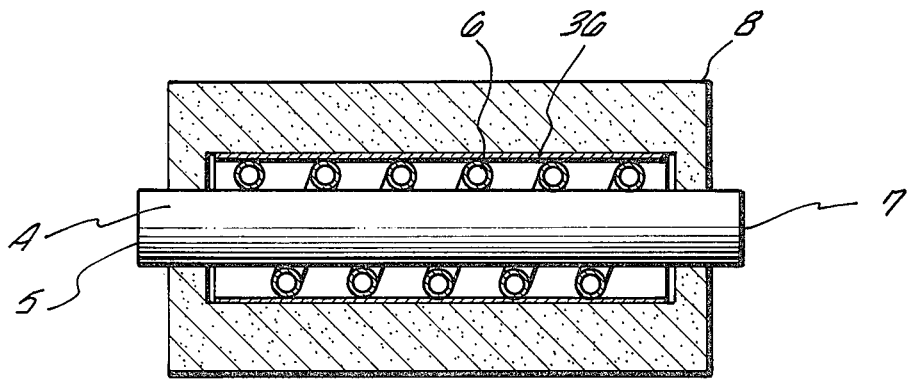
FIG. 2 is a schematic diagram illustrating a cross sectional view of a heat sink, reflective cavity configuration in accordance with the present invention.

Referring now to FIG. 2, an alternative embodiment for a heat sink 8 is disclosed wherein a thin, metallic foil reflector 36 is utilized in the cavity of the boron nitride heat sink 8 to improve the reflectivity. Gold has been found to be a suitable metal. A metallic coating of vacuum deposited gold film may be used as an alternative to metallic foil to improve the reflectivity. It is noted that the boron nitride can itself be polished to a high degree of reflectivity and such a foil reflector 36 may be omitted.

Referring to FIG. 3, the heat sink 8 may be configured to have helical grooves 38 to accommodate the helical flash lamp 6. The grooves 38 may be shaped to snuggly receive the flash lamp 6 to optimize heat transfer from the flash lamp 6 to the heat sink 8 and also optimise the pumping light coupling to the laser rod 4.

FIGS. 4 and 5 illustrate how a heat sink 8 may be configured to accommodate an oblong flash lamp 40 that is positioned adjacent and parallel to a laser rod 4. A reflector of thin metal foil 42 can be utilized to optimize the use of the light energy provided by the lamp 40. Again gold may be used as the metal for the reflector 42. Gold has been found to be eminently suitable as it does not readily oxidize. Gold has also been found to offer the best spectral reflectivity for the effective pumping band (96 percent at 5800 angstroms) of a neodymium laser rod 4.

Referring to the embodiments in FIGS. 6 and 7, the laser rod 4 is surrounded by an encapsuling flash lamp 44. A vacuum deposited gold film 46 can be positioned on the exterior surface of the lamp 44 to optimize the use of the light energy provided by the lamp 44.

It is to be understood that although the preferred embodiment of the subject invention has been disclosed as including a laser rod 4 made of glass doped with neodymium oxide ($Nd_2O_3$), it is to be noted that other certain transparent, single crystals such as yttrium aluminum garnet (YAG) or sodium lanthanum molybdenum oxide ($NaLaMoO_4$) doped with neodymium oxide may also be suitable for use with the present invention.

From the foregoing description it may now be appreciated that the subject invention provides a pulsed laser device that can be made compact, highly efficient and manually portable by reason of the total elimination of any requirement for a circulating fluid cooling system that is characteristically a part of all prior art laser systems. Specific parameters for the components included in the laser assembly have been disclosed to as fully describe the workings of the invention as is presently possible.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A compact, pulsed, manually-portable laser assembly comprising:
   a laser rod;
   a source of light energy positioned in close proximity to said laser rod for controllably irradiating said laser rod with pulsed light energy; and
   cooling means for effectively dissipating heat produced by said laser rod and said source of light energy, said cooling means consisting of a solid heat sink having a cavity in which said laser rod and source of light energy are housed, said heat sink being made of a material wherein both the heat conductance and resistivity characteristics thereof differ in a radial direction extending from the laser rod from such characteristics in a direction parallel to the axis of said laser rod, said heat produced in said cavity by said laser rod and said source of light energy being dissipated by said solid heat sink.

2. A compact, pulsed, manually-portable laser assembly comprising:
   a laser rod including a glass rod doped with neodymium oxide;
   a source of light energy positioned in close proximity to said laser rod for controllably irradiating said laser rod with pulsed light energy, said source of light energy being a helical flash lamp; and
   cooling means for effectively dissipating heat produced by said laser rod and said source of light energy, said cooling means consisting of a solid heat sink having a cavity in which said laser rod and source of light energy are housed, said heat sink being made with boron nitride having a heat conductance of approximately 0.28 watts $cm/cm^2K°$ and dielectric strength of approximately $3.8 \times 10^4$ volts/mm, said boron nitride being pressure molded to provide preferential directions for the thermal and resistivity characteristices thereof, said heat produced in said cavity by said laser rod and said source of light energy being dissipated by said solid heat sink.

* * * * *